United States Patent Office

3,706,584
Patented Dec. 19, 1972

3,706,584
COMPOSITIONS USEFUL IN THE PRODUCTION OF PAPER PRODUCTS AND BASED UPON NOVEL STARCH DERIVATIVES
Richard W. Cescato, Chicago, Ill., assignor to CPC International Inc.
No Drawing. Original application Dec. 30, 1966, Ser. No. 608,720, now Patent No. 3,654,263, dated Apr. 4, 1972. Divided and this application May 25, 1970, Ser. No. 48,674
Int. Cl. C08b 27/02
U.S. Cl. 106—214
32 Claims

ABSTRACT OF THE DISCLOSURE

Covers paper coating compositions and processes for making them, utilizing as a binder an oxidized cationic starch. The oxidized cationic starch is prepared by first reacting starch with a reagent that introduces a positive electric charge into the starch molecule, to a degree of substitution of from about 0.01 to about 0.1 with cationic-type substituents. This derivatized starch is then oxidized with a hypochlorite-type oxidizing agent, simultaneously to thin the starch molecule and to introduce carboxyl groups in sufficient quantity that the ratio of the percentage of the carboxyl groups by weight, dry basis, to the degree of substitution with the cationic-type substituent, is at least 1 to 1.

---

This application is a division of my earlier filed, copending application, Ser. No. 608,720, filed Dec. 30, 1966, now Pat. No. 3,654,263.

This invention relates to compositions utilizing novel starch derivatives as binders, and to processes of making these compositions. More particularly, the invention relates to compositions that are useful in sizing and coating paper and that contain the novel starch derivatives as binders therein.

Casein has been employed for many years in the preparation of paper coating compositions. Such compositions, based upon casein as the binder, exhibit many desirable characteristics, among which wet rub resistance is particularly outstanding. Unfortunately, casein is relatively expensive, is not always available, and at times exhibits instability. Moreover, casein requires careful handling if the paper coating compositions obtained are to be uniform and easily handled.

One object of the invention is to provide new, practical paper coating compositions and processes of making them.

Still another object of the invention is to provide practical paper coating compositions that can be used to produce coatings of greater web rub resistance than has been possible in the past with coatings based upon starch derivatives.

Another object of the invention is to provide new, practical, paper compositions based upon binders of novel starch derivatives, that will permit higher solids paper coatings and resultant greater paper machine speeds.

Other objects of the invention will be apparent hereinafter from the specification and from the recitals of the appended claims.

GENERAL

It has now been discovered that novel starch derivatives can be prepared on a practical basis by oxidizing an "intermediate" starch, that is, a starch that has been reacted with a reagent that introduces a positive electrical charge into the molecule, under reaction conditions such that the intermediate starch has residual unreacted hydroxyl groups. These novel starch derivatives are extremely useful in the preparation of compositions that are useful in the production of coated paper products. A coating composition, in accordance with this invention, comprises an aqueous slurry of a material selected from the group consisting of fillers, pigments, and mixtures thereof, and from about 5% to about 150% by weight of the material, dry basis, of a starch binder, at least a part of said starch binder comprising an intermediate starch that has been oxidized.

THE INITIAL STARCH

The initial starch includes any amylaceous substance such as untreated starch, as well as starch which has been treated by chemical or other means to produce dextrinized, hydrolyzed, esterified or etherified derivatives of starch, so long as the product is still essentially amylaceous in nature and still contains hydroxyl groups capable of reacting with reagents serving to introduce a positive electrical charge into the molecule. The initial starch may be derived from any plant sources, including corn, waxy maize, sorghum, tapioca, potato, wheat, rice and sago.

For example, the initial starch may be a corn starch that has been phosphorylated. Other suitable starch derivatives, that can be used as the initial starch, include such derivatives, for example, as carboxymethyl starch; carboxyethyl starch; sulfated starch; and sulfopropyl starch. In general, it is preferred that the degree of substitution (D.S.) of the initial starch be no greater than 0.05, in order to avoid swelling problems.

A phosphorylated starch, that is suitable for use as the initial starch, can be easily made in accordance with the following simple steps: dry the starch; add a concentrated solution of sodium tripolyphosphate; dry; roast for a few minutes at 275° F.–300° F.; cool promptly, and wash to remove excess salt. The product obtained is a monophosphorylated starch.

THE INTERMEDIATE STARCHES AND METHODS FOR PREPARING THEM

The term "intermediate starch" is used to identify the starch that is to be oxidized in accordance with the present invention.

The intermediate starch is prepared from the initial starch by reaction with a reagent that introduces a positive electric charge into the molecule, under reaction conditions such that the resultant intermediate starch has residual unreacted hydroxyl groups.

One common kind of intermediate starch comprises those starch derivatives that are commonly referred to in the art as "cationic" starches or "cationic" starch derivatives.

"Cationic" starch can be prepared by reacting an initial starch, usually by an etherification or an esterification reaction, with a reactant that introduces a cationic group into the starch molecule. Ordinarily, such a cationic group will contain nitrogen, sulfur, or phosphorus. Cationic starch characteristically has been considered to have a positively charged molecule. Ordinarily, therefore, cationic starch would be expected to respond to electrophoresis as a positively charged molecule, that is, to exhibit mobility toward the cathode at a pH of about 7 or 8, or perhaps, to exhibit little or no mobility. However, in the course of the present investigation, it has been found, surprisingly, that some starch derivatives, that would ordinarily be considered as cationic, exhibit mobility in the direction of the anode at pH 7–8 during electrophoresis.

For this reason, among others, reference is made in this application to starch derivatives that are formed by reactions with reagents that react to introduce a positive charge into the molecule, rather than to the less precise prior art terminology of cationic starch derivatives. For convenience, however, the term "cationic-type substituent"

is used to refer to a substituent group that introduces a positive electrical charge into the starch molecule, regardless of the net electrical charge on the molecule, and regardless of the response of the starch derivative to electrophoresis.

Examples of suitable derivative groups, that introduce a positive electrical charge into the initial starch molecule, are amine groups, either tertiary or quaternary, and sulfonium and phosphonium groups.

While a wide variety of such starch derivatives are available for use as intermediate starches in accordance with the present invention, it is preferred to use the starch derivatives prepared in accordance with U.S. Pat. 2,876,217, granted Mar. 3, 1959, to Eugene F. Paschall. As pointed out in that patent, starch derivatives may be prepared by reacting starch with the reaction product of an epihalohydrin and a tertiary amine or a tertiary amine salt. Tertiary amines suitable for the invention may be represented by the formula $$R_1-N-R_2$$
$$|$$
$$R_3$$

wherein $R_1$, $R_2$ and $R_3$ are from the group consisting of alkyl, substituted alkyl, alkene, aryl, and aralkyl, but if all three of $R_1$, $R_2$ and $R_3$ are the same, they each should contain not more than 4 carbon atoms. If all three $R_1$, $R_2$ and $R_3$ are not the same and if $R_3$ contains up to 18 carbon atoms, then $R_1$ and $R_2$ should preferably be from the group consisting of methyl and ethyl; and if $R_1$ and $R_2$ are joined to form a ring, then $R_3$ should preferably be from the group consisting of methyl and ethyl.

The reaction between epihalohydrin and the amine or the amine salt results in compounds which may be represented by the formula

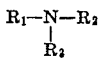

wherein $R_4$ is 2,3-epoxypropyl if the free amine is used, and $R_4$ is 3 halo 2 hydroxypropyl if a salt of the tertiary amine is employed.

The reaction between the epihalohydrin and the amine may be shown by the following equations, using trimethylamine and trimethylamine hydrochloride and epichlorohydrin for illustrative purposes.

(1)
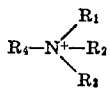

(2)
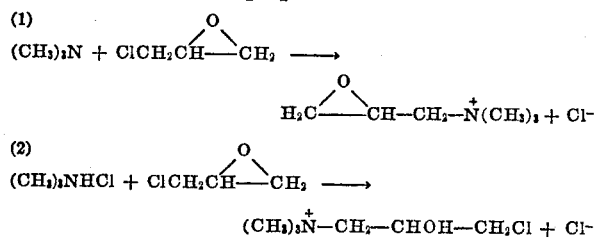

These products will be referred to hereinafter for the sake of simplicity as epihalohydrin reaction products. They react with starch in the presence of strongly alkaline catalyst to give the aforementioned products provided the epihalohydrin reaction products are purified to remove substantially all of the unreacted epihalohydrin and further provided the reaction is carried out under controlled conditions.

It is well known in the art that epihalohydrins, even in small amounts, will react with granular starch under strongly alkaline pH conditions to form cross-linked starch ethers which are nongelatinizable in boiling water. It is impossible to control the reaction of epihalohydrin with any tertiary amine in such a manner that a substantially epichlorohydrin-free reaction product is formed. That is, sufficient epihalohydrin always remains so that a non-gelatinizable (cross-linked) product results when the addition product is allowed to react with starch in the presence of strongly alkaline catalyst. However, by subjecting the amine epichlorohydrin reaction mixture to vacuum evaporation or solvent extraction, detrimental amounts of epihalohydrin can be removed therefrom so that cross-linking does not occur to any substantial extent when the reagent is allowed to react with starch and an easily gelatinizable quaternary ammonium starch derivative may be prepared.

The reaction of starch and the epihalohydrin reaction product may be illustrated by the following equations wherein the reaction product of trimethylamine and epichlorohydrin is representative:

(3)
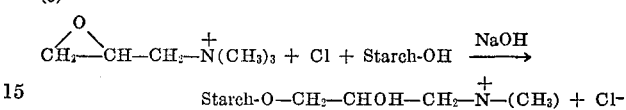

$$\text{Starch-O-CH}_2-\text{CHOH-CH}_2-\overset{+}{\text{N}}-(\text{CH}_3) + \text{Cl}^-$$

As tertiary amines, it is preferred to use those possessing at least two methyl groups attached directly to the nitrogen because of their superior reactivity to epihalohydrin to form the desired reagent. This reactivity is retained even when the third group of tertiary amine contains as many as 18 carbon atoms, such as is found in dimethylstearyl amine. This high reactivity is believed to result from the low order of steric hindrance imparted by the two methyl groups, allowing for intimate contact of epihalohydrin with the free electron pair of the tertiary amino nitrogen. By way of example, the following dimethyl tertiary amines may be mentioned as particularly suitable for carrying out this invention: trimethyl, dimethylbenzyl, dimethyldodecyl, and dimethylstearyl amines. However, other tertiary amines such as triethylamine, N-ethyl and N-methyl morpholine, N-ethyl and N-methyl piperidine and methyl diallylamine may also be used.

Starch derivatives that are suitable as intermediate starches, for use in the present invention, may be easily prepared in accordance with the Paschall patent, by simply mixing equimolar quantities of epihalohydrin and the tertiary amine or tertiary amino salt in an aqueous system, then allowing the reaction to proceed, preferably with agitation, until the formation of the reagent is complete. When a tertiary amine salt is employed in the preparation of the reagent, the pH of the aqueous solution should be at least 5 and preferably between 6 and 8.

The resultant addition product may be purified as desired by solvent extraction or vacuum distillation, to remove unreacted epihalohydrin and amine. Specific details as to the preparation and purification of the reagent are described in the Paschall patent. The starch derivatives are then prepared from the reagent by dissolving it in a suitable solvent, such as, for example, dioxane, isopropyl alcohol, or water, and then combining with the initial starch. A strongly alkaline catalyst is used to promote the reaction. Sodium sulfate or sodium carbonate may be added to raise the gelatinization temperature of the derivatized, "intermediate" starch, and in the case of sodium sulfate, to increase the reaction rate. Intermediate starches prepared under these conditions invariably have unsubstituted hydroxyl groups in the 6 position, and are therefore suitable intermediate starches for use in the present invention.

Although it is preferred to work with quaternary ammonium starch derivatives, prepared as described in the Paschall patent, other types of starch derivatives may be employed as the intermediate starch for the present invention.

For example, other suitable starch derivatives, for use as the intermediate starches in the present invention, include the tertiary amino alkyl ethers that result from the reaction of starch, under alkaline conditions, with a dialkyl amino alkyl epoxide or dialkyl amino alkyl halide or the corresponding compounds containing aryl groups in addition to the alkyl groups.

Primary and secondary amine derivatives may also be used as well as the corresponding starch esters. Accordingly, it is also possible to obtain satisfactory starch derivatives, for use as the intermediate starch, by reacting, with an initial starch, materials such as, for example: amino alkyl anhydrides; alkyl imines; amino alkyl epoxides; amino alkyl halides; alkyl amino alkyl epoxides or halides; amino alkyl sulfates; and the corresponding compounds containing aryl groups in addition to alkyl groups.

The sulfonium and phosphonium derivatives of starch are also known in the art. In the preparation of sulfonium derivatives of starch, for example, starch may be reacted in an aqueous alkaline medium with a beta-halogeno alkyl sulfonium salt, vinyl sulfonium salt, or an epoxy alkyl sulfonium salt.

Additional examples of suitable intermediate starches, that contain amine groups, are those that are obtained by the reaction of an initial starch with reagents such as, for example, the following: ethylene imine; propylene imine; isatoic anhydride; quinolinic anhydride; beta diethyl amino ethyl chloride; beta dimethyl amino isopropyl chloride; beta dimethyl amino ethyl chloride; 3-diethyl amino 1,2-epoxypropane; 3-dibutyl amino 1,2-epoxypropane; 2-bromo-5-diethyl amino pentane hydrobromide; N-(2,3-epoxypropyl) piperidine; N,N-(2,3-epoxypropyl) methyl aniline. The various halides (e.g., chloro-, bromo-, etc.) can be used interchangeably. In the above reagents, where the free amines have been indicated (e.g., beta diethyl amino ethyl chloride), one can also use the hydrochloride or other salts of these reagents (e.g., beta diethyl amino ethyl chloride hydrochloride). In fact, it is ordinarily preferred to use the salts since these tend to be less toxic and more easily handled. The hydrochloride moiety takes no part in the reaction with the starch. It will be seen that beside the alkyl, aryl and aralkyl types, the reagents may also include those containing cyclic groups. Therefore, when reference is made herein to the alkyl, aryl or aralkyl groups, it will be understood that these cyclic reagents are equivalents of those types. It should also be mentioned that the starch-amine products may be subsequently treated by known methods, so as to result in the quaternary ammonium salt, or such a quaternary ammonium salt may be made directly from raw starch by treating it with the reaction product of an epihalohydrin and a tertiary amine or tertiary amine salt. In either case the resulting starch derivative is suitable for use as the intermediate starch of this invention.

The intermediate starches may be characterized by a variety of different responses to electrophoresis and to other tests that are intended to identify net molecular electrical charge, degree of ionization, and the like. Thus, for example, a monophosphorylated starch may be used as the initial starch, and will be characterized by a response to electrophoresis that is typical of what the prior art refers to as an anionic material. Following reaction of this initial starch with a reagent that introduces a positive electrical charge into the molecule, it may nevertheless be found that the resultant intermediate starch has a response to electrophoresis that is characteristic of an "anionic" material.

The present invention is particularly concerned with those oxidized intermediate starches that are useful for paper coating and sizing. Those intermediate starches, that are considered suitable for these applications, are those having a degree of substitution of cationic-type substituents of from about 0.01 to about 0.1; and for use in clay coatings for paper, for high wet rub resistance and other desirable properties, it is preferred that the degree of substitution be from about 0.01 up to about 0.07 in both cases (as measured subsequent to oxidation).

THE OXIDATION STEP

The oxidation process that is employed, for oxidation of the intermediate starch, is the type of oxidation process that is known in the art for the oxidation of starch. The important and critical feature of the present invention, however, is that this oxidation step must be applied to an intermediate starch, as defined above, in order to achieve the results of the present invention. To say the same thing another way, the same kinds of starch derivatives and the same properties are not obtained if an oxidized starch is reacted, after oxidation, with a reactant that introduces a positive electrical charge into the molecule. It is essential that the oxidation step be applied to the intermediate starch, To accomplish oxidation, the intermediate starch is placed in an aqueous medium and is subjected to the action of a starch oxidizing agent, such as, for example, sodium hypochlorite, at a temperature in the range from about 40° F. to about 120° F., and preferably, at a temperature in the range of from about 80° F. to about 110° F. Ordinarily a period of two or three hours suffices for completion of the oxidation reaction. Other exemplary oxidizing materials that can be employed, in place of sodium hypochlorite, include sodium bromite, sodium chlorite, calcium hypochlorite, and the like.

THE OXIDIZED PRODUCTS

The oxidized products of the present invention generally have a white appearance. They may be either granular or pregelled. That is, they may be similar in appearance to either pearl starch or powdered starch, depending upon the physical characteristics desired in the end product. They can be produced in any desired physical form that is processed by the starch industry today.

Upon chemical analysis, the degree of substitution of the cationic-type substituent can be measured by conventional techniques. For example, when the intermediate starch used is a quaternary amine derivative, classical analytical techniques to measure the presence of nitrogen provide an accurate measure of the degree of substitution with cationic-type substituents. Ordinarily, the degree of substitution as measured subsequent to oxidation is found to be somewhat (slightly) lower than the degree of substitution as measured prior to oxidation.

The oxidation step normally introduce carboxyl groups and carbonyl groups into the starch molecule. For analytical convenience, the carboxyl groups have been measured on a weight basis and are so referred to herein. Conventional analytical techniques are employed to determine the amount of carboxyl present in the starch molecule.

As is customary, the figures included here in describing starch derivatives are statistical averages representing measurements made on a sample containing a representative and large number of molecules, and the measurements would not be expected to hold true of any individual molecule within the sample mass, necessarily.

The following examples illustrate several preferred embodiments of oxidized products made in accordance with the present invention. All parts and percentages referred to hereafter are by weight, dry basis, unless otherwise expressly so stated.

For clarity, the material obtained by oxidation of the intermediate starch is and has been referred to as the oxidized product. As will be seen, the oxidized product may have a response to electrophoresis or staining tests that is characteristic of what the prior art would refer to as either cationic, anionic, or nonionic starch derivatives.

EXAMPLE 1

Four different batches of oxidized products, hereafter designated as batches 1A, 1B, 1C, and 1D, were prepared by oxidizing intermediate starches, as will now be described in detail.

The intermediate starch was the same for the preparation of the two starch batches 1A and 1B, and was prepared in the following way.

0.2 mole (49 g. of 25% aqueous solution) of trimethylamine and 0.2 mole (18.5 g.) of epichlorohydrin were mixed with 50 ml. of water and the mixture agitated for three hours at room temperature. The resulting solution was concentrated to a thick syrup by vacuum distillation at 30° C. and 10–30 mm. pressure, while collecting the volatiles in a Dry Ice trap.

A slurry containing one mole (162 g. dry basis) of unmodified corn starch, 250 ml. of water, 0.17 mole (10 g.) of NaCl and 0.07 mole (2.8 g.) of NaOH was then added to the flask containing the syrup and the mixture was stirred for 17 hours at 40° C. The reaction mixture then was neutralized to pH 7 with HCl, the resulting starch ether was filtered. The filter cake was washed with water.

The intermediate starches for the preparation of oxidized products 1C and 1D were prepared in a generally similar manner, but with a lesser amount of the amine-epichlorohydrin reactant.

The analyses of these four intermediates starches are summarized below in Table 1.

TABLE 1.—ANALYSES OF THE INTERMEDIATE STARCHES

| Intermediate starch | 1A and 1B | 1C | 1D |
|---|---|---|---|
| Moisture, percent | 12.2 | 11.0 | 11.5 |
| pH | 6.4 | 6.7 | 6.1 |
| Scott viscosity, g./sec | 15/38 | 6/55 | 6/120 |
| Ash, percent | 0.26 | 0.30 | 0.14 |
| Degree of substitution | 0.033 | 0.020 | 0.026 |

These intermediate starches were then subjected to oxidation by slurrying the individual intermediate starches, respectively, in water, heating, then adding sodium hypochlorite while gently agitating the slurry, and permitting the oxidation reaction to go forward for about three hours. At the end of the reaction period, a sufficient quantity of dilute sulfuric acid was added to each slurry to adjust to a pH of about 6.0, then sodium bisulfite was added to obtain a negative reaction to orthotolidene.

The oxidation reaction conditions are described below in Table 2.

TABLE 2.—SUMMARY OF OXIDATION REACTION CONDITIONS

| | 1A | 1B | 1C | 1D |
|---|---|---|---|---|
| Slurry ° Bé | 20 | 20 | 20 | 20 |
| Starch solids (d.b.) | 35.5 | 35.5 | 35.5 | 35.5 |
| Slurry pH | 7.0 | 7.0 | 5.5 | 5.5 |
| Slurry temperature, ° F | 104 | 105 | 105 | 105 |
| Sodium hypochlorite, expressed as percent chlorine on starch | 4.0 | 5.0 | 4.0 | 4.0 |
| pH after hypo addition | 11.0 | 10.9 | 10.0 | 10.1 |
| 1:3 H₂SO₄ added to pH | 6.7 | 6.1 | 6.2 | 6.1 |
| Total reaction time (hours) | 3 | 3 | 3 | 3 |
| B.S.S. (sodium bisulfite) added to | (¹) | (¹) | (¹) | (¹) |

¹ Negative o-tolidene.

The oxidized products that were recovered from these oxidation reactions had the characteristics that are summarized below in Table 3.

TABLE 3.—ANALYSES OF OXIDIZED PRODUCTS

| | 1A | 1B | 1C | 1D |
|---|---|---|---|---|
| Moisture, percent | 12.1 | 7.1 | 11.2 | 9.1 |
| pH | 7.7 | 7.2 | 7.7 | 7.3 |
| Scott viscosity: | | | | |
| 100 grams, seconds | 74 | 46 | 66 | |
| 90 grams, seconds | 45 | | | 59 |
| Degree of cationic-type substitution | 0.025 | 0.021 | 0.015 | 0.019 |
| Carboxyl, percent | 0.10 | 0.30 | 0.28 | 0.26 |
| Solubles (d.b.), percent | 1.61 | 4.00 | 1.57 | 2.26 |
| Ash, percent | 1.11 | 1.97 | 1.16 | 1.17 |
| Methylene blue stain, percent positive | 10 | 35 | 90 | 90 |
| SF green stain | (¹) | (¹) | (¹) | (¹ |

¹ Negative.

The technique of applying stains to granular starches, for the purpose of obtaining a reaction that indicates that the starch is either "anionic" or "cationic," is well known. A positive reaction to a methylene blue stain indicates that the substrate material is "anionic." A positive reaction to SF green stain indicates that the substrate material is "cationic." These tests are roughly equivalent to electrophoresis testing, but generally lack the precision of indication of net molecular charge that response to electrophoretic testing may permit.

As Table 3 indicates, all four of the oxidized products, that were prepared in this example, were anionic in character as determined by methylene blue dye staining techniques. The four oxidized products were pasted and subjected to electrophoresis at pH 8. All were characterized by "anionic" mobility, thus tending to confirm the results obtained by dye staining. A pH of 8 was selected since clay coatings for paper are frequently applied at a pH of from about 7 to about 8, and a pH of about 8 is frequently used in commercial operations.

These four oxidized products were then evaluated as binders in clay paper coatings, in the following manner.

CLAY COATING PROCEDURE

A clay slip was prepared, at 76% solids, by the following procedure. 0.3% of tetrasodium pyrophosphate, based on clay, and 0.8% of a 10% aqueous solution of sodium hydroxide, based on the total slip, were added to the necessary amount of water. Kaolin KCS clay was then added, and the entire slip was agitated for 30 minutes.

The four oxidized products were then separated into several separate batches, as will appear from the tables below, to permit several experimental evaluations of the oxidized materials in paper coatings. Some of the oxidized products were cooked at 17.5% solids, others at 27.5% solids, on a steam bath at 200° F.–205° F. for 30 minutes, with agitation during the first five minutes or so. The resultant pastes were then cooled to about 150° F., and brought back to weight with added water.

Different batches of coating colors were prepared at 60% solids-18% adhesive and at 50% solids-18% adhesive, respectively. The materials used in making the coating colors were added in the following order:

(1) Clay slip at 76% solids.
(2) Starch paste at either 17.5% solids or at 27.5% solids, depending upon the coating solids percentage desired.
(3) The insolubilizing agent, if employed, which would be either glyoxal at 40% solids, or Parez 613 (a commercially available melamine-formaldehyde resin) at 80% solids.

After mixing the materials for a particular coating composition, the composition was thoroughly agitated for about 15 minutes. The pH was then determined, and each coating was placed in an air-tight container and held for two hours at about 110° F. in a constant temperature water bath.

Several characteristics of each coating composition were then observed. Thus, an initial viscosity determination was made on each coating composition after it had been held for two hours at 110° F., using a Brookfield Viscometer, Model RVF. Readings were taken at 10 r.p.m., 20 r.p.m., 50 r.p.m., and 100 r.p.m. The viscometer speed was then slowed and readings were taken during deceleration at 50 r.p.m., 20 r.p.m., and 10 r.p.m. Viscosity readings were also made on each coating after 24 hours at 110° F. at 100 r.p.m. and then at 20 r.p.m.

For convenience in evaluation of the characteristics of the coatings, reference is made hereafter to the Pseudoplastic Index. This index number was obtained by measuring the Brookfield viscosity at 10 r.p.m. on the descending side of the viscosity curve, and dividing by the apparent viscosity at 100 r.p.m.

The characteristics of the coatings are also indicated by a value that is hereafter referred to as the Thixotropic value. This value was determined by reading the apparent viscosity at 20 r.p.m., on the ascending side of the viscosity curve, then dividing by the viscosity at 20 r.p.m. on the descending side of the coating curve.

Each coating was applied to paper in the following manner. One set of coated paper was made with Mayer rod drawdowns, with each coating in this set being applied at 60% solids. The paper was first air-dried for two hours, and then dried in a forced air oven at various temperatures, as indicated in the following tables, for short periods of time.

A second set of coated paper was made by applying coatings at 50% solids on coating base stock, with the trailing blade attachment of a paper coater. The coated paper was calendered by three nip passes at 600 lbs. per linear inch, with heat. The paper was then conditioned for 24 hours in a constant temperature and humidity room at 50% relative humidity and at 72° F. prior to evaluation.

The several observations are recorded in the following tables:

TABLE 6.—VISCOSITIES OF CLAY COATINGS, 60% SOLIDS, 18% ADHESIVE WITH PAREZ 613 (MELAMINE-FORMALDEHYDE)

| | Oxidized product 1A | |
|---|---|---|
| Starch derivative batch, percent Parez 613 | 0 | 10 |
| Brookfield viscosity, cps. at 110° F. at: | | |
| 10 r.p.m | 46,000 | 40,000 |
| 20 r.p.m | 25,000 | 17,500 |
| 50 r.p.m | 16,200 | 9,000 |
| 100 r.p.m | 5,700 | 5,000 |
| 50 r.p.m | 10,800 | 7,200 |
| 20 r.p.m | 19,500 | 12,500 |
| 10 r.p.m | 30,000 | 21,000 |
| pH | 8.2 | 8.3 |
| Thixotropic value | 1.28 | 1.40 |
| Pseudoplastic index | 5.26 | 4.20 |
| Paper physical properties (Mayer rod drawdowns) | | |
| Dow wet rub passes: | | |
| Air-dried | 2 | 2 |
| 3 minutes at 200° F | 2 | 2 |
| 2 minutes at 300° F | 2 | 15 |

TABLE 4.—VISCOSITY OF CLAY COATINGS, 50% SOLIDS, 18% ADHESIVE WITH GLYOXAL

| | Batch— | | | | | | | | | | | |
|---|---|---|---|---|---|---|---|---|---|---|---|---|
| | 1A | | | | | | 1B | | 1C | | 1D | |
| Percent glyoxal | 0 | 1 | 3 | 5 | 7 | 10 | 5 | 10 | 5 | 10 | 5 | 10 |
| Brookfield viscosity, cps. at 110° F. at: | | | | | | | | | | | | |
| 10 r.p.m | 7,000 | 6,500 | 8,500 | 20,000 | 22,500 | 33,000 | 2,500 | 4,500 | 20,000 | 42,500 | 17,000 | 29,500 |
| 20 r.p.m | 4,200 | 3,900 | 4,800 | 11,000 | 11,400 | 17,500 | 1,600 | 2,900 | 11,500 | 24,500 | 10,000 | 16,000 |
| 50 r.p.m | 2,200 | 1,900 | 2,300 | 5,000 | 4,900 | 6,800 | 930 | 1,900 | 5,500 | 10,800 | 4,500 | 7,200 |
| 100 r.p.m | 1,300 | 1,100 | 1,350 | 2,600 | 2,500 | 3,500 | 600 | 950 | 3,150 | 5,700 | 2,400 | 4,000 |
| 50 r.p.m | 2,000 | 1,700 | 2,100 | 4,300 | 4,100 | 5,800 | 850 | 1,500 | 4,800 | 9,700 | 3,600 | 6,500 |
| 20 r.p.m | 3,500 | 2,900 | 3,600 | 8,800 | 8,500 | 12,500 | 1,500 | 2,700 | 8,800 | 19,400 | 6,400 | 12,500 |
| 10 r.p.m | 5,500 | 5,000 | 6,000 | 15,500 | 15,000 | 23,000 | 2,100 | 4,300 | 14,000 | 33,500 | 10,500 | 21,500 |
| 24 hours: | | | | | | | | | | | | |
| 100 r.p.m | 1,600 | 1,200 | 1,150 | 2,350 | 2,400 | 3,200 | 600 | 800 | 2,750 | 4,550 | 1,850 | 2,950 |
| 20 r.p.m | 4,000 | 3,200 | 3,000 | 8,000 | 6,500 | 11,000 | 1,500 | 1,200 | 8,200 | 15,000 | 5,000 | 8,600 |
| pH | 8.6 | 7.7 | 7.4 | 7.3 | 7.1 | 7.0 | 7.4 | 7.2 | 7.5 | 7.4 | 7.5 | 7.4 |
| Thixotropic value | 1.20 | 1.34 | 1.33 | 1.25 | 1.34 | 1.40 | 1.07 | 1.07 | 1.31 | 1.26 | 1.56 | 1.28 |
| Pseudoplastic index | 4.23 | 4.55 | 4.45 | 5.95 | 6.00 | 6.58 | 3.51 | 4.53 | 4.45 | 5.87 | 4.40 | 5.38 |
| Paper physical properties | | | | | | | | | | | | |
| Dow wet rub passes: | | | | | | | | | | | | |
| Initial | 2 | 2 | 5 | 15 | 15 | +25 | 15 | +30 | 15 | 25 | 15 | 25 |
| 1 week | 2 | 2 | 5 | 15 | 15 | +25 | 15 | +30 | 15 | 25 | 15 | 25 |
| 2 weeks | 2 | 2 | 5 | 15 | 15 | +25 | 15 | +30 | 15 | 25 | 15 | 25 |
| Dennison wax pick at | 13 | 12 | 12 | 13 | 13 | 14 | 13 | 14 | 13 | 13 | 13 | 13 |
| Brightness | 75 | 75 | 75 | 75 | 75.5 | 75.5 | 75.5 | 75.5 | 75.5 | 75.5 | 75 | 75 |
| Opacity | 89.5 | 89.0 | 88.5 | 88.5 | 88.5 | 89 | 88 | 88.5 | 88.5 | 88 | 88.5 | 88 |
| Gloss | 21 | 19 | 18 | 22 | 18 | 20 | 22 | 20 | 20 | 21 | 21 | 21 |
| Basis weight (24 x 38–500): | | | | | | | | | | | | |
| Lbs./ream | 51.6 | 51.6 | 51.2 | 50.5 | 51.1 | 51.1 | 49.7 | 49.8 | 49.6 | 49.7 | 50.3 | 49.8 |
| Lbs. coating/ream | 4.1 | 4.1 | 3.7 | 3.0 | 3.6 | 3.6 | 2.2 | 2.3 | 2.1 | 2.2 | 2.8 | 2.3 |

TABLE 5.—VISCOSITIES OF CLAY COATINGS, 50% SOLIDS, 18% ADHESIVE WITH PAREZ 613 (MELAMINE-FORMALDEHYDE)

| Starch derivative batch, percent Parez 613 | Oxidized product 1A | | | | |
|---|---|---|---|---|---|
| | 0 | 3 | 5 | 7 | 10 |
| Brookfield viscosity, cps. at 110° F. at: | | | | | |
| 10 r.p.m | 7,000 | 8,000 | 7,000 | 6,000 | 5,000 |
| 20 r.p.m | 4,200 | 4,500 | 4,200 | 3,600 | 3,400 |
| 50 r.p.m | 2,200 | 2,200 | 2,200 | 1,900 | 1,700 |
| 100 r.p.m | 1,300 | 1,300 | 1,300 | 1,200 | 1,100 |
| 50 r.p.m | 2,000 | 1,800 | 2,000 | 1,700 | 1,600 |
| 20 r.p.m | 3,500 | 3,200 | 3,400 | 2,800 | 2,700 |
| 10 r.p.m | 5,500 | 5,000 | 5,500 | 4,500 | 4,400 |
| 24 hours: | | | | | |
| 100 r.p.m | 1,600 | 1,300 | 1,650 | 1,200 | 1,300 |
| 20 r.p.m | 1,400 | 3,200 | 4,200 | 2,900 | 3,000 |
| pH | 8.6 | 8.5 | 8.6 | 8.6 | 8.7 |
| Thixotropic value | 1.20 | 1.45 | 1.23 | 1.28 | 1.25 |
| Pseudoplastic index | 4.23 | 3.85 | 4.23 | 3.75 | 4.00 |
| Paper physical properties | | | | | |
| Dow wet rub passes: | | | | | |
| Initial | 2 | 2 | 2 | 7 | 15 |
| 1 week | 2 | 2 | 2 | 7 | 15 |
| 2 weeks | 2 | 2 | 2 | 7 | 15 |
| Dennison wax pick at | 13 | 12 | 12 | 12 | 12 |
| Brightness | 75 | 75 | 75 | 75.5 | 75 |
| Opacity | 89.5 | 88.5 | 88.5 | 88.5 | 89 |
| Gloss | 21 | 25 | 20 | 22 | 21 |
| Basis weight (25 x 38–500): | | | | | |
| Lbs./ream | 51.6 | 50.5 | 50.7 | 50.7 | 51.0 |
| Lbs. coating | 4.1 | 3.0 | 3.2 | 3.2 | 3.5 |

TABLE 7.—VISCOSITIES OF STARCH PRODUCTS EMPLOYED IN COATINGS

| | Oxidized product of— | | | |
|---|---|---|---|---|
| | 1A | 1B | 1C | 1D |
| Starch batch, percent solids | 17.5 | 27.5 | 17.5 | 17.5 | 17.5 |
| Brookfield viscosity, 20 r.p.m., cps. at— | | | | |
| 200° F | 12 | 50 | 13 | 17 | 16 |
| 150° F | 32 | 130 | 18 | 38 | 33 |
| 110° F | 45 | 180 | 30 | 73 | 59 |
| 77° F. (2 hours) | 107 | 450 | 53 | 180 | 128 |
| 77° F. (24 hours) | 118 | 560 | 53 | 254 | 150 |
| pH (paste) | 7.7 | 7.8 | 6.7 | 7.0 | 7.0 |

These data demonstrate that paper coatings made in accordance with the present invention have several advantageous characteristics that make them particularly desirable for practical use. For example, the coating compositions are characterized by flow properties that permit the compositions to be applied readily by the highly mechanized coating process techniques that are currently in use. The compositions have the ability to retain water sufficiently so that upon application to paper, the loss of water into the paper web is at a level that does not have a deleterious effect upon the coating. Moreover, compositions made in accordance with the invention have excellent stability, as demonstrated by the fact that substantial changes in viscosity do not occur.

In addition, the data demonstrate the inherent capability of the oxidized products of the present invention to function for their desired purpose, which means that the delicate electrostatic balance of the coating compositions has not been disturbed. The oxidized products are light in color and therefore are compatible with compositions of any desired pigmentation. Also, coating compositions made in accordance with the present invention have been found to be receptive to printing inks of various types with a desirable balance between ink penetration and resistance to ink penetration. Moreover, coated papers made in accordance with the present invention calender well to give desired smoothness and gloss without undesirable adherence of the coated paper to the surface of the calender rolls.

EXAMPLE 2

Five different batches of oxidized products, hereafter designated as batches 2A, 2B, 2C, 2D, and 2E, respectively, were prepared by oxidizing intermediate starches, as will now be described in detail.

The intermediate starch was the same for the preparation of the three batches 2A, 2B and 2C. This intermediate starch was similar to that used for batch 1C, as will appear from the analyses below, and it was prepared substantially in the manner described in Example 1.

The intermediate starches that were used for the preparation of batches 2D and 2E respectively were commercially available materials having the characteristics described below.

These intermediate starches were subjected to oxidation by the same technique as was employed in Example 1. The oxidation reaction conditions are described below in Table 9.

TABLE 9.—OXIDATION REACTIONS WITH SODIUM HYPOCHLORITE

| Parent material | 2A | 2B | 2C | 2D | 2E |
|---|---|---|---|---|---|
| Sodium hypochlorite, expressed as percent chlorine on starch | 3 | 4 | 5 | 4 | 4 |
| *Slurry data* | | | | | |
| Slurry ° Bé | 20 | 20 | 20 | 20 | 20 |
| Starch solids (d.b.) | 35.5 | 35.5 | 35.5 | 35.5 | 35.5 |
| pH | 7.1 | 7.1 | 7.1 | 5.7 | 5.8 |
| Temperature, ° F | 115 | 115 | 115 | 115 | 115 |
| *Reaction data* | | | | | |
| pH after hypo addition | 10.4 | 10.4 | 10.4 | 9.8 | 10.9 |
| Reaction time (hours) | 4 | 4 | 4 | 3 | 3 |
| 1:3 H$_2$SO$_4$ to pH | 6.6 | 6.6 | 6.6 | 6.6 | 6.5 |
| Bisodium sulfite (B.S.S.) | (1) | (1) | (1) | (1) | (1) |

[1] Negative o-tolidene.

The oxidized products that were recovered from these oxidation reactions had the characteristics that are summarized below in Table 10.

TABLE 10.—ANALYSES OF OXIDIZED PRODUCTS

| Product | 2A | 2B | 2C | 2D | 2E |
|---|---|---|---|---|---|
| Moisture, percent | 12.6 | 10.6 | 10.8 | 9.6 | 13.3 |
| pH | 7.8 | 7.7 | 7.6 | 6.5 | 6.7 |
| Scott viscosity, g./sec | 75 g./58 secs | 90 g./44 secs | 100 g./43 secs | 90 g./thick. | 90 g./thick. |
| Carboxyl, percent | 0.18 | 0.31 | 0.51 | 0.09 | 0.16 |
| Degree of cationic-type substitution | 0.014 | 0.014 | 0.014 | 0.019 | 0.024 |
| Methylene blue | Negative | Positive | Positive | Negative | 25% positive. |
| SF green | do | Negative | Negative | Slightly positive. | Negative. |

TABLE 8.—ANALYSES OF THE INTERMEDIATE STARCHES

| Intermediate starch | 2A, 2B, 2C | 2D | 2E |
|---|---|---|---|
| Moisture, percent | 12.0 | 10.0 | 7.0 |
| pH | 6.2 | 5.5 | 5.7 |
| Scott viscosity, g./sec | 6/54 | | 10/32 |
| Degree of cationic-type substitution | 0.022 | 0.030 | 0.039 |
| Methylene blue | (1) | (1) | (1) |
| SF green | (2) | (2) | (2) |

[1] Negative.
[2] Positive.

These five oxidized products were evaluated as binders in clay paper coatings, in essentially the same manner as described in Example 1. Similar observations were then made, as recorded below.

TABLE 11.—CLAY COATING 50% SOLIDS, 18% ADHESIVE, OXIDIZED STARCHES

| | Oxidized product | | | | | | | | | |
|---|---|---|---|---|---|---|---|---|---|---|
| | 2A-1 | 2A-2 | 2B-1 | 2B-2 | 2C-1 | 2C-2 | 2D-1 | 2D-2 | 2E-1 | 2E— |
| Percent Cl$_2$ on starch | 3 | 3 | 4 | 4 | 5 | 5 | 4 | 4 | 4 | 4 |
| Percent glyoxal | 0 | 5 | 0 | 5 | 0 | 5 | 0 | 5 | 0 | 5 |
| Brookfield viscosity, cps. at 110° F. at: | | | | | | | | | | |
| 10 r.p.m | 17,000 | 50,000 | 4,000 | 7,400 | 2,600 | 4,400 | 36,400 | 62,000 | 15,000 | 34,000 |
| 20 r.p.m | 10,000 | 29,000 | 2,500 | 4,350 | 1,650 | 2,700 | 20,700 | 40,000 | 9,500 | 21,000 |
| 50 r.p.m | 4,700 | 12,200 | 1,400 | 2,200 | 860 | 1,420 | 9,800 | 20,400 | 4,900 | 10,000 |
| 100 r.p.m | 2,750 | 6,700 | 900 | 1,300 | 600 | 920 | 5,600 | 12,000 | 3,000 | 5,800 |
| 50 r.p.m | 4,200 | 11,400 | 1,200 | 1,960 | 850 | 1,280 | 8,600 | 19,200 | 4,500 | 9,600 |
| 20 r.p.m | 8,000 | 24,000 | 2,200 | 3,500 | 1,350 | 2,200 | 16,000 | 35,000 | 8,000 | 18,000 |
| 10 r.p.m | 12,500 | 40,500 | 3,500 | 5,600 | 2,000 | 3,300 | 26,500 | 54,000 | 12,500 | 30,000 |
| 24 hours: | | | | | | | | | | |
| 100 r.p.m | 3,250 | 5,750 | 980 | 1,360 | 700 | 1,060 | 6,500 | 14,000 | 3,500 | 5,800 |
| 20 r.p.m | 9,200 | 19,800 | 2,450 | 3,750 | 1,700 | 2,750 | 18,700 | 40,000 | 9,000 | 18,000 |
| pH | 8.8 | 7.9 | 8.8 | 8.0 | 8.7 | 7.9 | 8.3 | 7.4 | 8.3 | 7.6 |
| Thixotropic value | 1.25 | 1.26 | 1.13 | 1.24 | 1.22 | 1.23 | 1.29 | 1.14 | 1.18 | 1.16 |
| Pseudoplastic index | 4.54 | 6.05 | 3.89 | 4.30 | 3.33 | 3.59 | 4.73 | 4.50 | 4.17 | 5.18 |
| Coated Paper Physical Properties | | | | | | | | | | |
| Dow wet rub (passes) dried at: | | | | | | | | | | |
| 220° F., 2 minutes | 1 | 7 | 1 | 5 | 1 | 3 | 1 | 5 | 1 | 5 |
| 220° F., 3 minutes | 1 | 10 | 1 | 5 | 1 | 3 | 1 | 5 | 1 | 5 |
| 220° F., 5 minutes | 1 | 10 | 1 | 7 | 1 | 5 | 2 | 7 | 2 | 5 |
| Air-dried | 1 | 5 | 1 | 3 | 1 | 2 | 1 | 3 | 1 | 3 |
| Dennison wax pick at | 16 | 16 | 14 | 14 | 13 | 14 | 14 | 13 | 11 | 12 |
| Basis weight (25 x 38-500): | | | | | | | | | | |
| Lbs./ream | 55.7 | 56.3 | 56.8 | 56.4 | 56.3 | 56.5 | 56.5 | 58.1 | 56.0 | 57.3 |
| Coating weight, lbs | 7.7 | 8.3 | 8.8 | 8.4 | 8.3 | 8.5 | 8.5 | 10.1 | 8.0 | 9.3 |

All of these oxidized products are useful as binders for clay coatings, as the above data demonstrates.

CONCLUSION

Similar demonstrations of the invention have shown that the step of oxidizing intermediate starches is generally useful in producing novel, valuable products from starch derivatives that have had a positive electrical charge introduced into the molecule during derivatization.

For example, the process of the present invention produces valuable products, for use in clay coatings, sizings, and in other applications, from starches that are substituted with amine, sulfonium, and phosphonium groups. Some exemplary starch derivatives, that oxidize to yield valuable products, are the starch ethers derived by reacting corn stach under alkaline conditions, with agitation, with:

(a) b-diethyl amino ethyl chloride hydrochloride
(b) b-dimethyl amino ethyl chloride hydrochloride
(c) b-diethyl amino ethyl chloride
(d) b-dimethyl amino isopropyl chloride hydrochloride
(e) 3-dibutyl amino-1,2-epoxypropane
(f) 2-bromo-5-diethyl amino pentane hydrobromide
(g) N-(2,3-epoxypropyl) piperidine
(h) N,N-(2,3 epoxypropyl) methyl aniline
(i) 2-chloroethyl-methyl-ethyl sulfonium iodide
(j) benzyl methyl 2-chloroethyl sulfonium iodide
(k) 2-chloroethyl tributyl phosphonium chloride Other exemplary starch derivatives, that are similarly valuable, are made by reacting other starches, such as, for example, potato, sago, and tapioca starches, with these and similar reactants.

The intermediate starch that is used in the practice of this invention may be one that does not have a net positive electrical charge. For example, a phosphorylated starch may be reacted with a reagent that introduces a positive electrical charge into the molecule, while leaving the molecule nevertheless with a response to electrophoresis that is characteristic of an anionic material. Upon oxidation, products are obtained that are highly useful in the wet sizing of paper and as binders for paper coatings.

In order to achieve superior characteristics in a clay coating on paper, certain chemical characteristics of the oxidized products of this invention can be adjusted. In the following remarks, it should be understood that the term "cationic D.S." refers to the degree of substitution by a substituent that introduces a positive electrical charge into the molecule (whether or not the molecule itself carries a net positive charge). The term "percent carboxyl" refers to the weight of the group —COOH, present in the oxidized product, as compared to the weight of the oxidized product, expressed on a percentage basis.

Generally, as to wet rub resistance and a good wax pick test, superior results are obtained with oxidized products that have: higher cationic D.S., that is, above the lower limit figure of about 0.01 and toward the upper limit figure of about 0.1; lower ratios of $$\frac{\text{percent carboxyl}}{\text{cationic D.S.}}$$

quaternary amine derivatives as compared to other amine derivatives; and a response to electrophoresis at a pH of from about 7 to about 8, or at pH 8, that is characteristic of a cationic material, as compared to oxidized products that exhibit responses that are characteristic of either nonionic or anionic materials, where the terms "cationic," "anionic," and "nonionic," are used to denote net molecular charge, or mobility, as determined by electrophoresis of a pasted product.

Oxidized products made in accordance with the present invention have properties, with respect to paper coating and sizing, that differ in kind from those produced by first oxidizing a starch, then derivatizing with a substituent that introduces a postive charge into the molecule. For example, as to wet rub resistance, under comparable conditions of observation, the difference in favor of the oxidized products of the present invention is a factor of at least two times.

While the invention has been described in connection with specific embodiments thereof, it will be understood that it is capable of further modifications, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A composition useful in the production of paper products comprising: an aqueous slurry of a material selected from the group consisting of fillers, pigments, and mixtures thereof, and from about 5% to about 150% by weight of the material, dry basis, of a starch binder, at least a part of said starch binder comprising a starch that has been reacted with a reagent that introduces a positive electric charge into the starch molecule, under conditions such that said starch, after reaction with said reagent, has a degree of substitution with a cationic-type substituent of from about 0.01 to about 0.1, and has residual unreacted hydroxyl groups, and that subsequently has been oxidized by a starch oxidizing agent of the sodium hypochlorite type in a basic pH environment, simultaneously to thin the starch and to introduce carboxyl groups into the starch molecule in sufficient quantity that the ratio of the percentage of carboxyl groups by weight, dry basis, to said degree of substitution, is at least 1 to 1.

2. A composition in accordance with claim 1 that also includes an insolubilizing reagent for said oxidized product.

3. A composition in accordance with claim 2 wherein the insolubilizing agent is glyoxal.

4. A composition in accordance with claim 1 wherein the degree of substitution with the cationic-type substituent is up to about 0.07.

5. A composition in accordance with claim 1 wherein carboxyl groups are present in the molecule, as a result of the oxidation, in sufficient quantity that the percentage of carboxyl groups by weight, dry basis, is at least 0.1%.

6. A composition in accordance with claim 1 wherein the starch, after reaction with said reagent, is a starch derivative selected from the group consisting of starch ethers and starch esters containing substituents selected from the group consisting of primary, secondary, tertiary and quaternary amine groups, sulfonium groups, and phosphonium groups.

7. A composition in accordance with claim 1 wherein the oxidation is carried to the point where the net charge on the molecule is negative as determined by electrophoresis at a pH of from about 7 to about 8.

8. A composition in accordance with claim 1 wherein the oxidation is carried to the point where the net charge on the molecule is positive as determined by electrophoresis at a pH of from about 7 to about 8.

9. A composition in accordance with claim 1 wherein the oxidation is carried to the point where there is no response to electrophoresis at a pH of from about 7 to about 8.

10. A composition useful in the production of paper products comprising: an aqueous slurry of a material selected from the group consisting of fillers, pigments, and mixtures thereof, and from about 5% to about 150% by weight of the material, dry basis, of a starch binder, at least a part of said starch binder comprising a starch derivative that has a degree of substitution with a cationic-type substituent of from about 0.01 to about 0.1, that introduces a positive electric charge in the molecule, and that has been subjected to an oxidation step, subsequent to derivatization with said substituent, with a starch oxidizing agent of the sodium hypochlorite type in a basic pH environment to effect carboxyl formation and to reduce molecular size, whereby the derivatized, oxidized starch molecule contains both positively and negatively charged groups, said carboxyl formation being effected so as to introduce carboxyl groups into the starch molecule in sufficient quantity that the ratio of the percentage of carboxyl groups by weight, dry basis, to said degree of substitution, is at least 1 to 1.

11. A composition in accordance with claim 10 that also includes an insolubilizing reagent for the said starch derivative.

12. A composition in accordance with claim 10 wherein the said starch derivative of the binder comprises a starch that has been phosphorylated, then derivatized with a cationic-type substituent that introduces a positive electric charge in the molecule, then oxidized.

13. A composition in accordance with claim 12 wherein the oxidation is carried to the point where the net charge on the molecule is negative as determined by electrophoresis at a pH of from about 7 to about 8.

14. A composition in accordance with claim 12 wherein the oxidation is carried to the point where the net charge on the molecule is positive as determined by electrophoresis at a pH of from about 7 to about 8.

15. A composition in accordance with claim 12 wherein the oxidation is carried to the point where there is no response to electrophoresis at a pH of from about 7 to about 8.

16. A composition useful in the production of paper products comprising: an aqueous slurry of a material selected from the group consisting of fillers, pigments, and mixtures thereof, and from about 5% to about 150% by weight of the material, dry basis, of a starch binder, at least a part of said starch binder comprising a starch ether that has a degree of substitution of from about 0.01 to about 0.1 with a quaternary ammonium nitrogen prepared by etherifying starch in contact with a strongly alkaline catalyst, with the reaction product of epihalohydrin and a compound from the group consisting of tertiary amines and tertiary amine salts; said reaction product being substantially free of unreacted epihalohydrin; the tertiary amine being represented by the formula

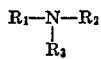

wherein $R_1$, $R_2$ and $R_3$ are radicals containing not more than 18 carbon atoms from the group consisting of alkyl, subsitituted alkyl, alkene, cyclic formed by joining two R's as previously defined, phenyl and monocyclic aralkyl and when all three R's are not the same and any R contains more than 3 carbon atoms, then the other two R's are each an alkyl group not larger than ethyl, and when two R's are joined to form a ring, then the third R is an alkyl group not larger than ethyl; then oxidizing the resultant starch derivative with an oxidizing agent of the hypochlorite type, in a basic pH environment, to introduce carboxyl and carbonyl groups into the molecule and to reduce molecular size.

17. A composition in accordance with claim 16 that also includes an insolubilizing reagent for oxidized starch.

18. A composition in accordance with claim 17 wherein the insolubilizing agent is glyoxal.

19. A composition in accordance with claim 16 wherein the carboxyl groups are present in the molecule in an amount of at least 0.01% by weight, dry basis.

20. A composition in accordance with claim 16 wherein the oxidation is carried to the point where the net charge on the molecule is positive as determined by electrophoresis at a pH of from about 7 to about 8.

21. A composition in accordance with claim 16 wherein the oxidation is carried to the point where the net charge on the molecule is negative as determined by electrophoresis at a pH of from about 7 to about 8.

22. A composition in accordance with claim 16 wherein the oxidation is carried to the point where the net charge on the molecule is such that there is no response to electrophoresis at a pH of from about 7 to about 8.

23. A process for the production of a coating preparation for application to paper, comprising preparing together, in a common aqueous vehicle:
(a) an aqueous dispersion of a material selected from the group consisting of fillers, pigments, and mixtures thereof, and
(b) a paste of starch, at least a portion of which is a starch that has been reacted with a reagent that introduces a positive electric charge into the starch molecule, under conditions such that said starch material, after reaction with said reagent, has a degree of substitution with a cationic-type substituent of from about 0.01 to about 0.1, and subsequently oxidized by a starch oxidizing agent of the sodium hypochlorite type in a basic pH environment, simultaneously to introduce carboxyl groups and to reduce molecular size.

24. A process in accordance with claim 23 wherein the degree of substitution of the oxidized starch is up to about 0.07.

25. A process in accordance with claim 23 wherein carboxyl groups are present in the molecule, as a result of the oxidation, in sufficient quantity that the ratio of the percentage of carboxyl groups by weight, dry basis, to the degree of substitution resulting from said reaction, is at least 1 to 1.

26. A process in accordance with claim 23 wherein carboxyl groups are present in the molecule, as a result of the oxidation, in sufficient quantity that the percentage of carboxyl groups by weight, dry basis, is at least 0.01%.

27. A process in accordance with claim 23 wherein the oxidized starch derivative is a starch ether containing quaternary ammonium nitrogen prepared by etherifying starch in contact with a strongly alkaline catalyst, with the reaction product of epihalohydrin and a compound from the group consisting of tertiary amines and tertiary amine salts; said reaction product being substantially free of unreacted epihalohydrin; the tertiary amine being represented by the formula

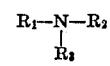

wherein $R_1$, $R_2$ and $R_3$ are radicals containing not more than 18 carbon atoms from the group consisting of alkyl, substituted alkyl, alkene, cyclic formed by joining two R's as previously defined, phenyl and monocyclic aralkyl and when all three R's are not the same and any R contains more than 3 carbon atoms, then the other two R's are each an alkyl group not larger than ethyl, and when two R's are joined to form a ring, then the third R is an alkyl group not larger than ethyl; then oxidizing the resultant starch derivative with an oxidizing agent of the hypochlorite type in a basic pH environment to introduce carboxyl and carbonyl groups into the molecule and to reduce molecular size.

28. A process in accordance with claim 27 wherein the carboxyl groups are present in the molecule in an amount of at least 0.01% by weight, dry basis.

29. A process in accordance with claim 23 including as an additional step:
   mixing with the blend of said dispersion and said paste an insolubilizing reagent for the oxidized starch product.
30. A process in accordance with claim 29 wherein the insolubilizing agent is glyoxal.
31. A process in accordance with claim 27 including as an additional step:
   mixing with the blend of said dispersion and said paste an insolubilizing reagent for the oxidized starch product.
32. A process in accordance with claim 31 wherein the insolubilizing agent is glyoxal.

References Cited

UNITED STATES PATENTS

| | | | |
|---|---|---|---|
| 3,622,563 | 11/1971 | Elizer | 260—233.3 R |
| 3,320,080 | 5/1967 | Mazzarella | 106—210 |
| 3,459,632 | 8/1969 | Caldwell | 127—33 X |
| 3,467,647 | 9/1969 | Benninga | 106—210 X |

THEODORE MORRIS, Primary Examiner

U.S. Cl. X.R.

117—156 R, 165R; 260—233.3 A, 233.3 R, 233.5 R